(12) United States Patent
Kroll (10) Patent No.: US 7,654,230 B2
(45) Date of Patent: Feb. 2, 2010

(54) DOMESTIC ANIMAL TELEPHONE

(75) Inventor: Mark W. Kroll, Simi Valley, CA (US)

(73) Assignee: Kroll Family Trust, Simi Valley Road, CA (US)

( * ) Notice: Subject to any disclaimer, the term of this patent is extended or adjusted under 35 U.S.C. 154(b) by 612 days.

(21) Appl. No.: 11/142,149

(22) Filed: May 31, 2005

(65) Prior Publication Data

US 2005/0284412 A1 Dec. 29, 2005

Related U.S. Application Data

(60) Provisional application No. 60/560,066, filed on Jun. 7, 2004.

(51) Int. Cl.
*A01K 29/00* (2006.01)

(52) U.S. Cl. ...................................... 119/712

(58) Field of Classification Search ................ 119/712, 119/718, 719, 720, 721, 51.01, 51.02, 711, 119/908

See application file for complete search history.

(56) References Cited

U.S. PATENT DOCUMENTS

| | | | | | |
|---|---|---|---|---|---|
| 5,299,529 | A | * | 4/1994 | Ramirez | 119/51.11 |
| 6,145,472 | A | * | 11/2000 | Vittuari et al. | 119/51.5 |
| 2003/0171096 | A1 | * | 9/2003 | Ilan et al. | 455/3.06 |
| 2003/0230248 | A1 | * | 12/2003 | Hotmer | 119/718 |
| 2006/0011145 | A1 | * | 1/2006 | Kates | 119/719 |

OTHER PUBLICATIONS

Engadget internet publication, "The Pet Phone remote food dispenser" from: http://www.engadget.com/2005/09/07/the-pet-phone-remote-food-dispenser/ retrieved on Aug. 10, 2007.

* cited by examiner

*Primary Examiner*—T. Nguyen
(74) *Attorney, Agent, or Firm*—Vidas, Arrett & Steinkraus (57) ABSTRACT

A phone for pets and pet owners is taught which allows the owner to call the house and "talk" to the pet. The owner can then see a video image of the pet in front of the pet phone to verify presence and happiness. The device can also present the owner's scent to the pet and deliver treats on remote command.

4 Claims, 7 Drawing Sheets

DOMESTIC ANIMAL TELEPHONE

This application is related to the Provisional application 60/560,066 filed Jun. 7, 2004.

BACKGROUND OF THE INVENTION

A large number of individuals have mammalian pets in their homes. These are typically dogs or cats. When the pet owners are away at work they often would like to communicate with their pets. Similarly, the pets often would like to communicate with their owner.

Speaker phones have been modified, by the Ablephone company, by adding a large button expander of a "speed dial" button for trained rescue dogs to call 911 in an emergency. While such a system is probably useful for some medical emergencies, it does not provide any "social" communication or emotional comfort on either side. Unfortunately, such a system to this date there has been no practical means for this sort of communication.

SUMMARY OF THE INVENTION

The gist of this invention is a practical telephone for mammalian pets. The major teaching of this invention is a telephone that can be called by a human from a remote location in such a way that the animal can answer the phone. Another teaching of the invention is a phone that can be dialed by a mammalian pet to a programmed number which will typically be the office number of the owner.

Other significant objects of the invention are a domestic mammalian phone that will release a human scent to the animal by remote command. Another teaching is an apparatus to allow a human owner at a remote location to release a small food treat to a pet.

Another important teaching of this invention is an apparatus and method to allow audiovisual communication remotely between a pet and an owner. Another important teaching of this invention is a phone with soft fuzzy or soft pliable durable sections for pet licking or chewing.

DETAILED DESCRIPTION OF THE INVENTION AND THE PREFERRED EMBODIMENT

Figure 1:
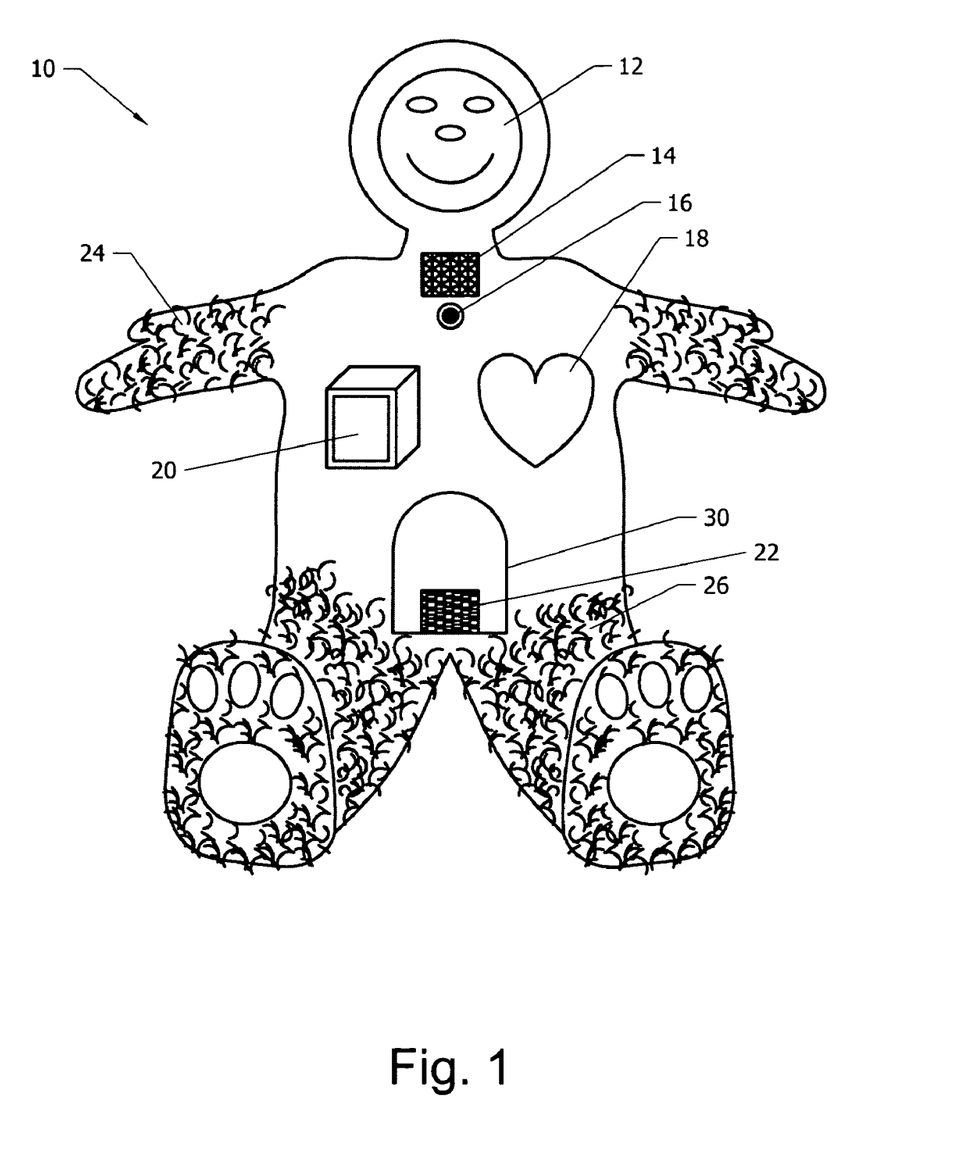
FIG. 1 shows the front view of the apparatus.

FIG. 1 shows the basic apparatus of the invention. The animal phone 10 comprises a video monitor or liquid crystal or other video display 12 to show the owner's face and also comprises a speaker 14 to perform the speakerphone functions. Camera 16 captures the pet image as well as any part of the room covered by the lens. A door 18 covers a scent reservoir, which will allow the owner to release a scent to the animal by remote control.

A treat reservoir is located inside the phone that would release a treat to a holding cup 20 on the front of the phone. Paw pad 22 is used by the animal to dial the phone to call the owner. This paw pad 22 is hidden within semi-protective opening 30. Fuzzy short arms 24 and longer legs 26 are used for additional comfort for the animal. These may be purely passive for rubbing or may be motorized for petting of the animal. Preferably they are passive but removable so they can be replaced after pet damage. High friction feet (typically rubber) are attached to the bottom of the pet phone to make it hard to slide around.

Figure 2:
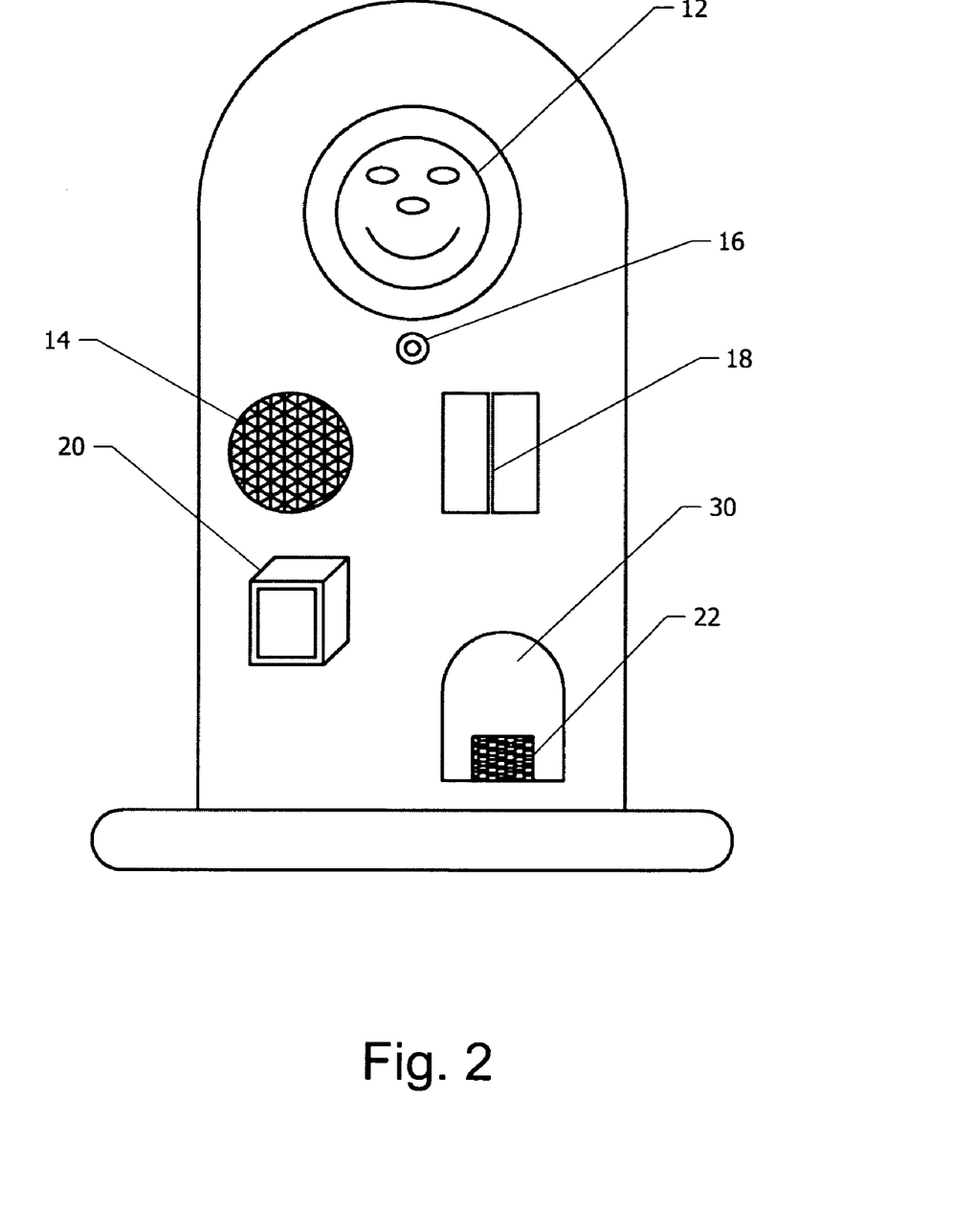
FIG. 2 shows another front view of the apparatus.

FIG. 2 shows a simplified front version of the apparatus. Again the visual monitor 12 shows a face of the owner at a remote location speaking through speaker 14. The animal's face (and room behind) is captured by camera 16. On remote command the double doors 18 may be opened via an electrical solenoid to release scent from an owner-scented object hidden within.

The treat cup 20 will hold a treat such as a food pellet, a little bone, and a bone cookie that was released also by remote control. Finally the paw pad 22 is somewhat covered within the opening of the cave 30 to allow the animal to call the owner without too many accidental calls.

The video display is preferably between 10-15 cm in diameter (or height and width) but dimensions of 5-20 cm are also acceptable. The portico for the answer/call paw switch is ideally about 3-4 inches in width and about 3-5 inches in height. However, widths of 4-6 inches and heights of 5-7 inches are also functional. The width of the main body of the phone is preferably 7-12 inches but widths of 5-18 inches are also functional. The width of the base is preferably greater than that of the main body to make it resistant to tipping by the pet. Ideally, the base is 2-5 inches wider than the main body but it may be 5-8 inches wider for even greater stability. The height of the pet phone is preferably matched to the eye height of the pet that will be using it and different models may be made with different heights. In general, the preferred height is about 15-22 inches. However a height of 12-15 inches is preferred for a small dog or cat model. A height of 22-36 inches is preferred for a large dog model.

Figure 3:
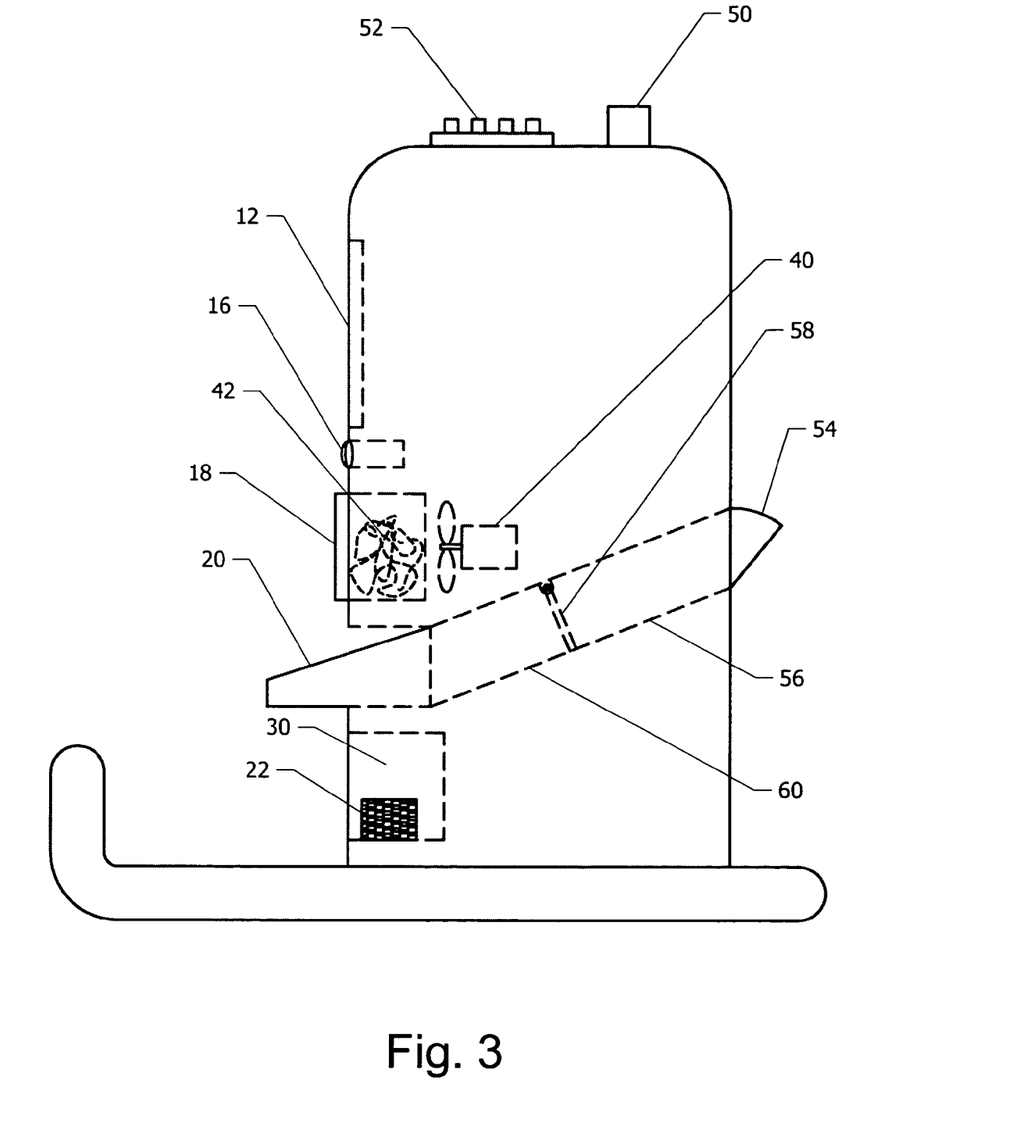
FIG. 3 shows the side view of the apparatus.

FIG. 3 shows the side view of the invention. We see the side view of the liquid crystal display 12 and the camera 16 to allow the owner to see the pet's image as well. Door 18 is used to shield a scented item 42 in the scent reservoir with fan motor 40 behind it. In operation the owner would place a small item of scented clothing such as a sock into the scent reservoir. Upon remote command the fan motor 40 would be enabled and the door 18 would open. This would blow the owner's scent through the door to the portal into the animal's face giving the pet the reassurance of the owner's scent.

The treat reservoir system comprises an input chute 54 which feeds into a reservoir area 56. On remote command the solenoid 58 lifts up enough to allow the passage of one treat which then falls down through chute 60 to sit outside into the treat reservoir cup 20. In this figure we also see a side view of the paw pad 22 within the cutout area 30.

Finally, at the top of the phone is a small keypad 52 to allow for the programming of various functions and, most importantly, the owner's work or mobile phone number. USB connector 50 is used to allow the owner to download a fixed picture into the screen 12. This could also be used to download an MP3 file of pleasant music or the owner's voice whenever the call did not go through.

The depth of the device main body is preferably 6-8 inches. However, depths of 2-12 inches can also be functional. The depth of the base is preferably 4-6 inches greater than that of the main body while a base depth of only 0-4 inches would still be functional. This figure shows an optional lip on the front of the base.

Figure 4:
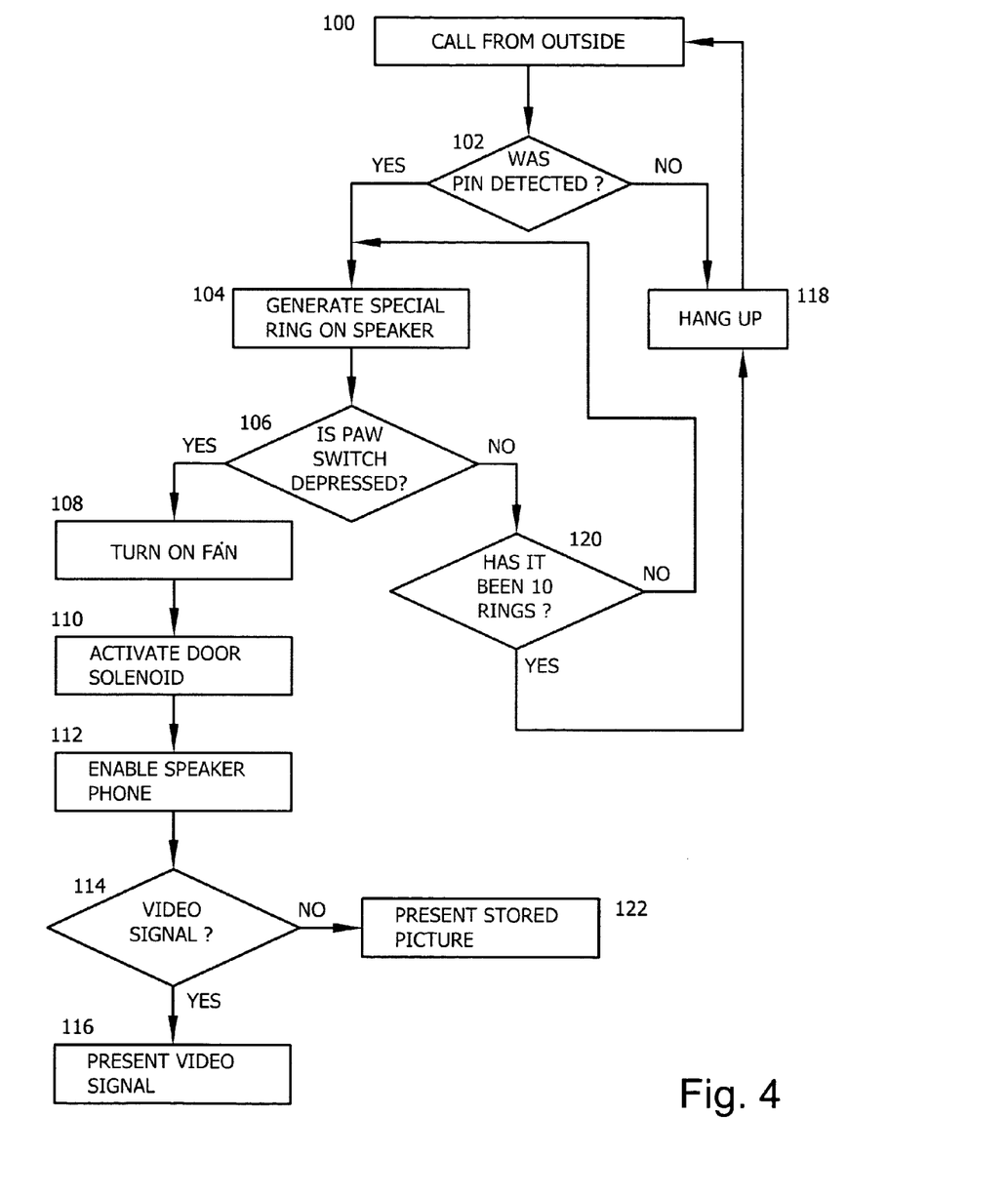
FIG. 4 shows the method of the invention for receiving an outside call.

FIG. 4 shows the method of the invention to handle an outside call. First at step 100 a call is made from the outside and it is answered. At step 102 the method asks if a PIN was detected. If it is not then at step 118 the method will simply hang up and return to monitoring mode.

If a PIN was detected then the method will go down to generate a special ring on the speaker in step 104. At step 106 the method will ask if the paw switch was depressed. If the answer is "no" then at step 120 the method will ask if there have been ten rings. The method will continue trying until 10 rings have been received. At the end of 10 rings then the method will proceed to step 118 to hang up. In an alternative embodiment, the telephone will automatically answer after the tenth if the correct PIN was entered. Thus the pet would not have to push anything and would merely have 10 rings to approach the phone and listen.

In an alternative embodiment, the verification, that the call is from the owner, is made by the use of "Caller ID." This is not preferred as an owner may wish to call in from many different phone lines including a hotel.

If the pet answers the phone by depressing the paw switch then at step 108 the method will turn on the fan. At step 110 it will activate the door solenoid to enable the animal to sense the scent of the owner. At step 112 the method will enable the speakerphone. At step 114 the method will ask if there is video signal. If not it will present a stored picture at step 122. If there is a video signal present then the method will present that video signal at step 116 to the animal. This would be the case if the owner has, for example, a web cam on their computer at work.

Research on the pet phone has led to very interesting results. The pet phone was partially simulated with a high resolution iSight™ camera, high resolution Apple® liquid crystal monitors, high fidelity JBL speakers, and the iChat™ video conferencing program. At one location was a yellow Labrador retriever (and participating researchers) and at a remote location was a member of the owner's family with a good relationship with the dog. After the link was established, the dog was directed to the monitor with a large and very clear image of the human smiling "at the dog." The dog was absolutely unimpressed. But, the human was extremely pleased to see the remote image of the dog on her monitor!

The study then advanced into an audio portion. The remote human called out the dog's name and spoke in a pleasant and energetic voice. The dog was immediately transformed and began wagging her tail and eagerly trying to find the exact location of the speaker. However, the remote human could not entice the dog to "speak" back. While it was clear that the dog was thrilled to hear the familiar voice, it had no interest in reciprocating. Nevertheless, the remote human was very satisfied to see the obvious happiness in the visual image of the dog.

From this research comes the nonobvious "Law of Pet Telecommunication." The law is as follows: for successful pet telecommunication, the human must see and the pet must hear. As a corollary, there is minimal utility in passing the human image to the pet and minimal utility is passing the pet's sounds to the human. Hence, an attractive and economical embodiment of the pet phone transmits the human voice and the pet video image but does not transmit the human image. This saves the cost of an LCD screen on the pet phone.

Figure 5:
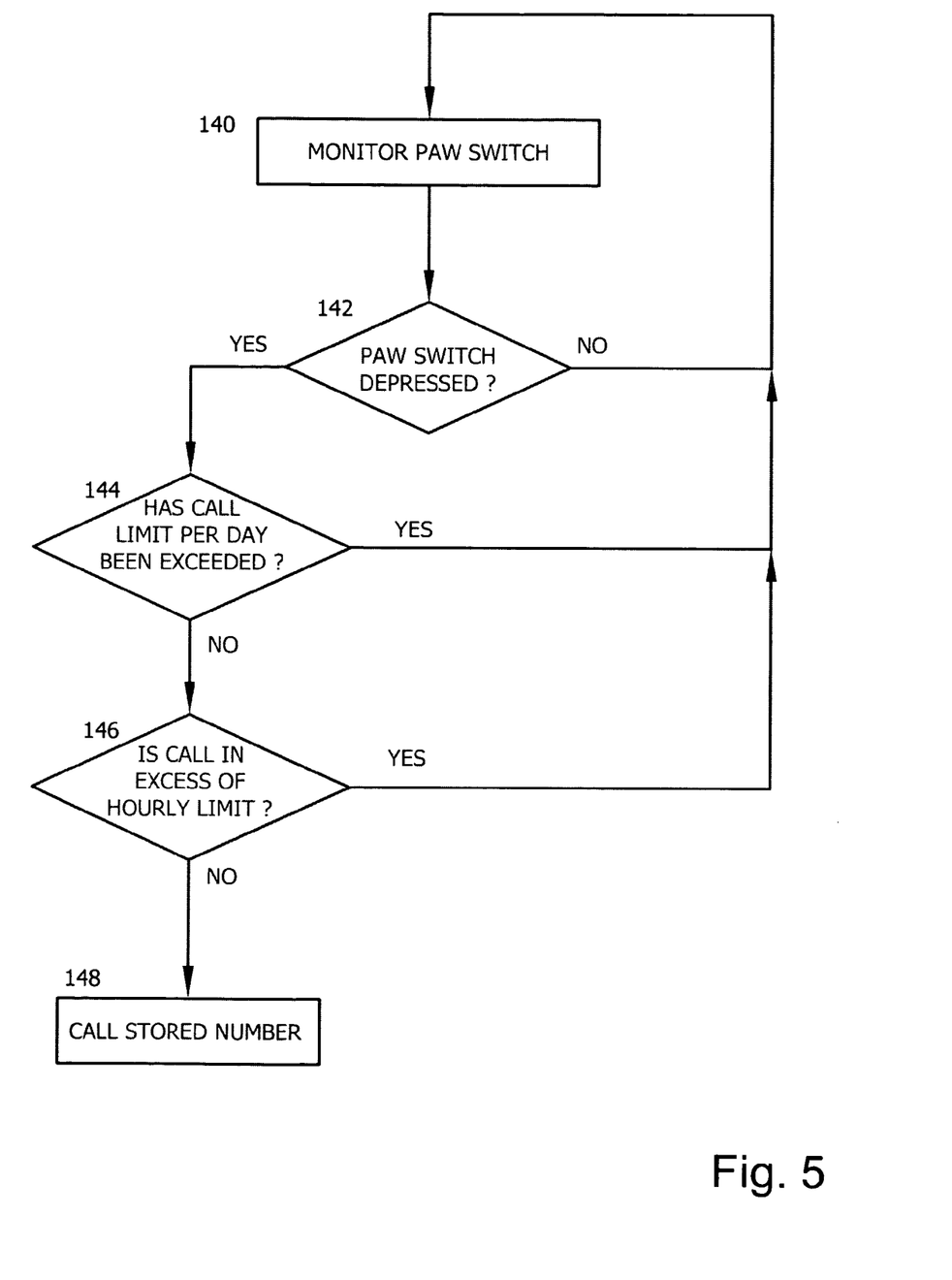
FIG. 5 shows the method of the invention for generating a call by the animal.

FIG. 5 discusses the basic method for the phone to make a call. In step 140 the method will monitor the paw switch. If the switch is depressed then in step 142 the method will detect that. It will then go on to step 144 to check if the call limit per day has been exceeded. For example, the owner may limit the pet to calling 4 times per day. If this call limit is exceeded then the method will ignore the paw switch depression and go back to monitoring mode. If the answer in step 144 is "no" then the method will go on to step 146.

At step 146 the method will ask is the call in excess of the hourly limit. If the answer is "yes" then the method will go back into the monitoring mode. If the answer is "no" the method will go to step 148 and call the stored number.

Figure 6:
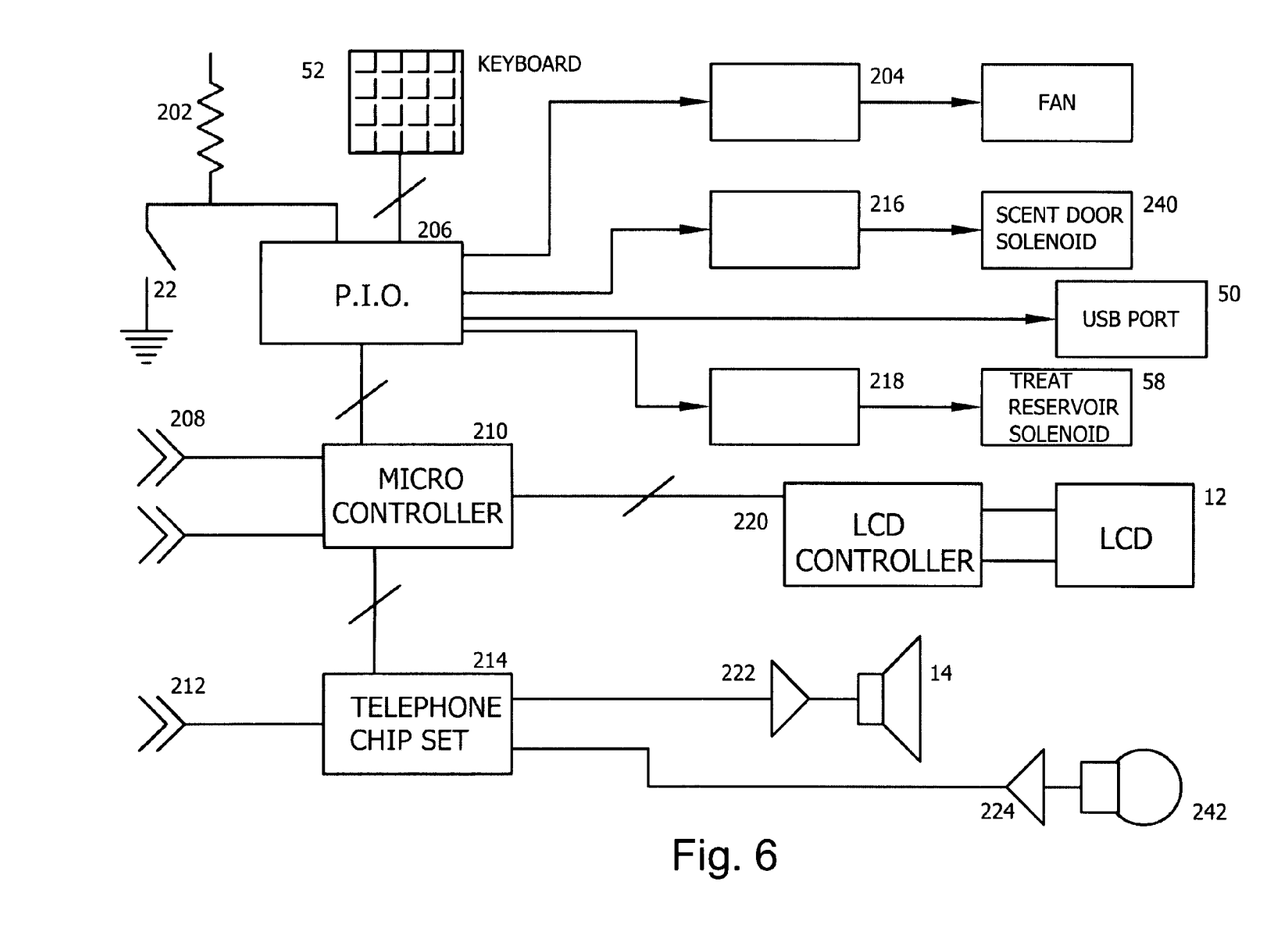
FIG. 6 shows the electronic circuits schematic.

FIG. 6 shows the basic electronic circuitry of the apparatus. Paw switch 22 is pulled up by resistor 202 which is then fed into the programmable input/output (PIO) chip 206. The PIO receives the keyboard 52 signal and also drives the fan through motor driver 204. The PIO further communicates with the USB port connector 50. The PIO commands the scent door solenoid 240 to open through a solenoid driver circuit 216. The PIO also enables the treat reservoir solenoid 58 through solenoid driving circuitry 218. The power input 208 will typically be fed by a wall mounted power supply such as a simple plug-in transformer. That will drive the micro-controller 210 which in turns communicates with the PIO 206. The PIO communicates with the camera directly or alternatively through an image processor integrated circuit. The image is then giving to the micro-controller 210 for further compression before being send to the telephone chip set 214.

The micro-controller then communicates with the LCD controller 220 which drives the LCD 12. The phone plug 212 drives the telephone speakerphone chip set 214 which communicates through amplifier 222 to drive the speaker 14. Alternatively, the link to the outside world could be through a VoIP wireless Internet link. Alternatively, the link to the outside world could be through an audio/video chat service such as AOL Instant Messenger™ 5.5.

Optional microphone 242 drives the amplifier 224 which then communicates with the telephone chip set. In an alternative embodiment the speaker 14 also functions as a microphone.

Figure 7:
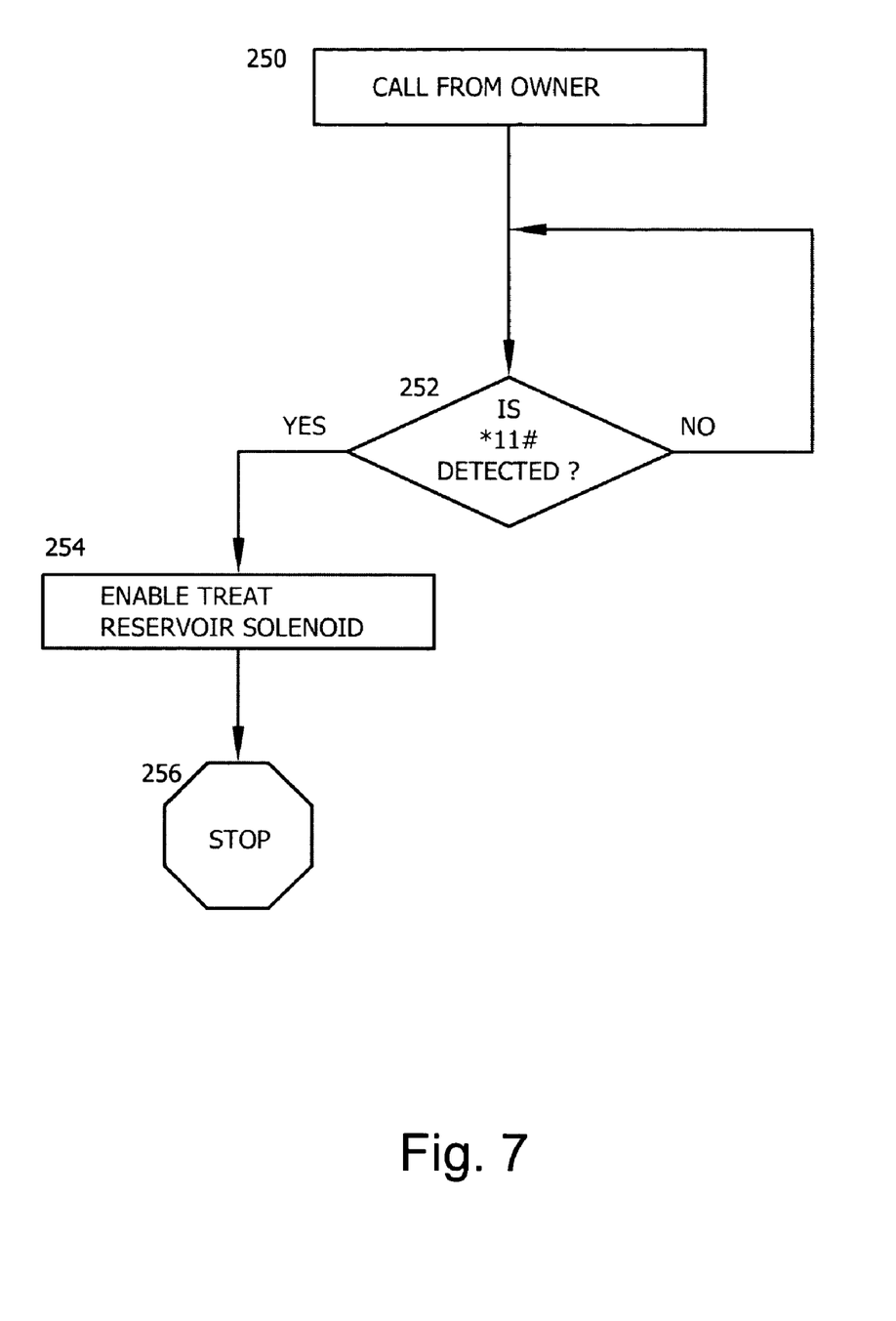
FIG. 7 shows the method of the invention for releasing a food treat.

FIG. 7 shows the method of the invention for dispensing a treat by remote command. At step 250 a call from the owner is received. At step 252 the method asks if the special code *11# is detected. If not then the method goes back to monitoring for a normal call. If it is detected then it goes to step 254. At this step it will enable the treat reservoir solenoid to open which will let a food treat go down the chute to the animal. The method will then stop at step 256.

As is well understood, many functions in electronic circuitry may be realized through software program execution and this alternative is meant to be included whenever it is practical throughout this invention.

I claim:

1. A method of allowing a pet owner to call a pet comprising:
   Providing a speaker situated near a floor for the pet use;
   Providing a scent reservoir, the scent reservoir contains an owner-scented item;
   Providing a telephone near the pet owner;
   Initiating a call from the telephone by the pet owner to the speaker near the floor for the pet use;
   Verifying that the call is from the pet owner; activating the scent reservoir to release a scent from the owner-scented item;
   amplifying a signal from the pet owner delivered by a phone line link;
   Applying the amplifier signal to the speaker near the floor; and
   allowing the owner to speak to the pet.

2. The method of claim 1, further comprising generating a special ring to alert the pet that the owner is calling.

3. The method of claim 1, further comprising delivering an edible treat to the pet.

4. The method of claim 1, further comprising providing an audio signal from the pet back to the owner.

* * * * *

UNITED STATES PATENT AND TRADEMARK OFFICE
CERTIFICATE OF CORRECTION

PATENT NO. : 7,654,230 B2
APPLICATION NO. : 11/142149
DATED : February 2, 2010
INVENTOR(S) : Mark W. Kroll It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 643 days.

Signed and Sealed this

Twenty-third Day of November, 2010

David J. Kappos
*Director of the United States Patent and Trademark Office*